(12) United States Patent
Nakajima

(10) Patent No.: US 7,273,183 B2
(45) Date of Patent: Sep. 25, 2007

(54) WIRELESS TAG

(75) Inventor: Keiichi Nakajima, Tokyo (JP)

(73) Assignee: SoftBankBB Corp., Tokyo (JP)

( * ) Notice: Subject to any disclaimer, the term of this patent is extended or adjusted under 35 U.S.C. 154(b) by 0 days.

(21) Appl. No.: 11/206,850

(22) Filed: Aug. 19, 2005

(65) Prior Publication Data

US 2006/0049266 A1 Mar. 9, 2006

Related U.S. Application Data

(63) Continuation of application No. PCT/JP2004/001766, filed on Feb. 18, 2004.

(30) Foreign Application Priority Data

Feb. 19, 2003 (JP) ............................. 2003-041407

(51) Int. Cl.
*G06K 19/06* (2006.01)
(52) U.S. Cl. .......................... 235/492; 705/41
(58) Field of Classification Search ................ 235/380, 235/487, 488, 490, 492; 705/41; 40/124.09, 40/124.11; 340/568.7, 5.6
See application file for complete search history.

(56) References Cited

U.S. PATENT DOCUMENTS

| | | | | |
|---|---|---|---|---|
| 5,710,421 | A * | 1/1998 | Kokubu | 235/492 |
| 6,068,192 | A * | 5/2000 | McCabe et al. | 235/487 |
| 6,073,856 | A | 6/2000 | Takahashi | |
| 6,272,324 | B1 * | 8/2001 | Rudisill et al. | 455/575.8 |
| 2003/0173408 | A1 * | 9/2003 | Mosher et al. | 235/492 |

FOREIGN PATENT DOCUMENTS

| | | |
|---|---|---|
| CN | 1306263 A | 8/2001 |
| EP | 1 120 739 A2 | 8/2001 |
| JP | 07-335433 | 12/1995 |
| JP | 2000-048147 | 2/2000 |
| JP | 2001-216488 | 8/2001 |
| JP | 2002-202723 | 7/2002 |
| JP | 2002-366917 A | 12/2002 |
| JP | 2003-141479 | 5/2003 |
| JP | 2003-216919 | 7/2003 |

OTHER PUBLICATIONS

UNKNOWN, The Electronic Tickets Using IC Tag, Nihon Keizai Newspaper, (Japan), pp. 1, (Dec. 16, 2002). English translation of newspaper article—Original Japanese article not attached.
Unknown Author, The Electronic Tickets Using IC Tag Nihon Keizai Newspaper Article dated Dec. 16, 2002, Japan.

* cited by examiner

*Primary Examiner*—Michael G. Lee
*Assistant Examiner*—Kumiko C. Koyama
(74) *Attorney, Agent, or Firm*—Stroock & Stroock & Lavan LLP

(57) ABSTRACT

A wireless tag includes a circuit module having an electromagnetic induction unit for generating an electromotive force by an electromagnetic wave of the outside and an information storing unit for storing information and outputting the information by the electromotive force, a base part on which the circuit module is disposed and which is foldable, and a locking member provided in the base part which electrically cuts off the electromagnetic induction unit in case that the base part is folded and locks the base part in the folded state. Further, the wireless tag includes a belt for attaching the circuit module to an object. The base part is folded with the belt disposed between its both sides and thus the belt becomes a ring shape. In addition, the locking member of the wireless tag is disposed near the information storing unit and has a projection part projecting from the base part and a base side insertion part into which the projection unit is inserted, and the belt has a hole into which the locking member is inserted in case of being disposed between both sides of the base part.

12 Claims, 13 Drawing Sheets

WIRELESS TAG

CROSS REFERENCE

This is a continuation application of PCT/JP2004/001766 filed on Feb. 18, 2004 which claims priority from a Japanese Patent Application No. 2003-041407 filed on Feb. 19, 2003, the contents of which are incorporated herein by reference.

BACKGROUND OF THE INVENTION

1. Field of the Invention

The present invention relates to a wireless tag. More particularly, the present invention relates to a wireless tag for preventing illicit use of entrance tickets at an event hall and the like.

2. Description of Related Art

A visitor can enter an event hall such as a concert hall, an exhibition ground, etc. by presenting a ticket previously bought to a receptionist of the event. There is a wireless tag used as this kind of ticket as disclosed, for example, at page 15 of Nihon Keizai newspaper dated on Dec. 16, 2002. Depending on an event of which term reaches several days, sometimes, a user can enter the event hall as often as he/she can by using one ticket during the term of the event. In case of this kind of event, a receptionist of the event confirms whether or not a ticket is regular or a retrieving apparatus provided at an entrance gate retrieves information of a wireless tag when a visitor enters the even hall and allow the visitor to re-enter.

However, since the receptionist of the event determines to allow a visitor to re-enter by confirming only a ticket presented by the visitor, there is a problem that he/she admits the visitor to re-enter even in case the ticket is a theft or the ticket has been transferred to the visitor. There is also the same problem in case of using a wireless tag.

SUMMARY OF THE INVENTION

Accordingly, it is an object of the present invention to provide a wireless tag, which is capable of overcoming the above drawbacks accompanying the conventional art. The above object can be achieved by combinations described in the independent claims. The dependent claims define further advantageous and exemplary combinations of the present invention.

According to the first aspect of the present invention, a wireless tag includes: a circuit module having an electromagnetic induction unit for generating an electromotive force by an electromagnetic wave of the outside and an information storing unit for storing information and outputting the information by the electromotive force; a base part on which the circuit module is disposed and which is foldable; and a locking member provided in the base part which electrically cuts off the electromagnetic induction unit in case that the base part is folded and locks the base part in the folded state.

The wireless tag further includes a belt for attaching the circuit module to an object. The base part is folded with the belt disposed between its both sides and thus the belt becomes a ring shape. Further, the locking member is disposed near the information storing unit and has a projection part projecting from the base part and a base side insertion part into which the projection unit is inserted, and the belt has a hole into which the locking member is inserted in case of being disposed between both sides of the base part.

According to the second aspect of the present invention, a wireless tag includes: a main and a subsidiary electromagnetic induction units each of which generates an electromotive force by an electromagnetic wave of the outside; and an information storing unit for storing information and outputting the information by the electromotive force, wherein the subsidiary electromagnetic induction unit can be bent from its initial position where it is coplanar with the main electromagnetic induction unit to its layered position where it is layered on the main electromagnetic induction unit. In the initial position, the direction of an electromotive force generated by the subsidiary electromagnetic induction unit of the wireless tag with respect to the information storing unit is the same as that of an electromotive force of the main electromagnetic induction unit, and, in the layered position, the direction of an electromotive force generated by the subsidiary electromagnetic induction unit with respect to the information storing unit is the inverse of that of an electromotive force of the main electromagnetic induction unit.

The information storing unit of the wireless tag has a threshold voltage which makes the information output. The threshold voltage is lower than voltage generated at both ends of the information storing unit by the main electromagnetic induction unit for an electromagnetic wave of a predetermined intensity of the outside and higher than voltage generated at both ends of the information storing unit by the main and subsidiary electromagnetic induction units for an electromagnetic wave of the predetermined intensity in the layered position. The subsidiary electromagnetic induction unit of the wireless tag is electrically connected with the main electromagnetic induction unit in series, and the wireless tag further includes a cut part for electrically cutting off the subsidiary electromagnetic induction unit in case the subsidiary electromagnetic induction unit moves to the layered position. Further, in the initial position, the direction of an electromotive force generated by the subsidiary electromagnetic induction unit with respect to the information storing unit may be the inverse of that of an electromotive force of the main electromagnetic induction unit, and, in the layered position, the direction of an electromotive force generated by the subsidiary electromagnetic induction unit with respect to the information storing unit may be the same as that of an electromotive force of the main electromagnetic induction unit.

According to the third aspect of the present invention, a wireless tag which is attached to an object and sends information on the object wirelessly, includes: a circuit module having an electromagnetic induction unit for generating an electromotive force by an electromagnetic wave of the outside and an information storing unit for storing information and outputting the information by the electromotive force; an attachment part for attaching the circuit module to the object; and a conducting wire part disposed on the attachment part which constitutes a closed circuit with at least the information storing unit, wherein the conducting wire part is electrically cut off in case the circuit module is separated from the object, and thus, the information storing unit is inhibited from operating. Further, the attachment part of the wireless tag has a belt for attaching the circuit module to the object by its ring shape and the conducting wire part has a ring shape substantially in accordance with the ring shape of the belt. In addition, the conducting wire part of the wireless tag is electrically connected with the electromagnetic induction unit and the information storing unit in series.

According to the fourth aspect of the present invention, a wireless tag includes: a circuit module having an electromagnetic induction unit for generating an electromotive force by an electromagnetic wave of the outside and an information storing unit for storing information and outputting the information by the electromotive force; a base part on which the circuit module is disposed and which is foldable; a locking member for locking the base part in its folded state; and an open cut part for electrically cutting off at least a part of the circuit module in case the base is open from its folded state.

The locking member of the wireless tag is disposed near the information storing unit and has a projection part projecting from the base part and a base side insertion part into which the projection unit is inserted, the open cut part has a cut part with a cut adapted to surround the projection part and the information storing unit, and the cut part is separated from the base part by a force smaller than a force required to pull out the projection part from the base side insertion part in case the base part is open from the folded state and thus the circuit module is electrically cut off. The wireless tag further includes a belt for attaching the circuit module to an object. Further, the base part is folded with the belt disposed between its both sides and thus the belt becomes a ring shape. In addition, the belt of the wireless tag has a hole into which the locking member is inserted in case of being disposed between both sides of the base part.

The wireless tag further includes a conducting wire part disposed on the attachment part which constitutes a closed circuit with at least the information storing unit. The conducting wire part has substantially a ring shape in accordance with the ring shape of the belt, the electromagnetic induction unit has a main and a subsidiary electromagnetic induction units, the subsidiary electromagnetic induction unit is electrically connected with the main electromagnetic induction unit in parallel and can be bent from its initial position where it is coplanar with the main electromagnetic induction unit to its layered position where it is layered on the main electromagnetic induction unit, and the locking member electrically cuts off the subsidiary electromagnetic induction unit in case the subsidiary electromagnetic induction unit moves from the initial position to the layered position.

The summary of the invention does not necessarily describe all necessary features of the present invention. The present invention may also be a sub-combination of the features described above.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
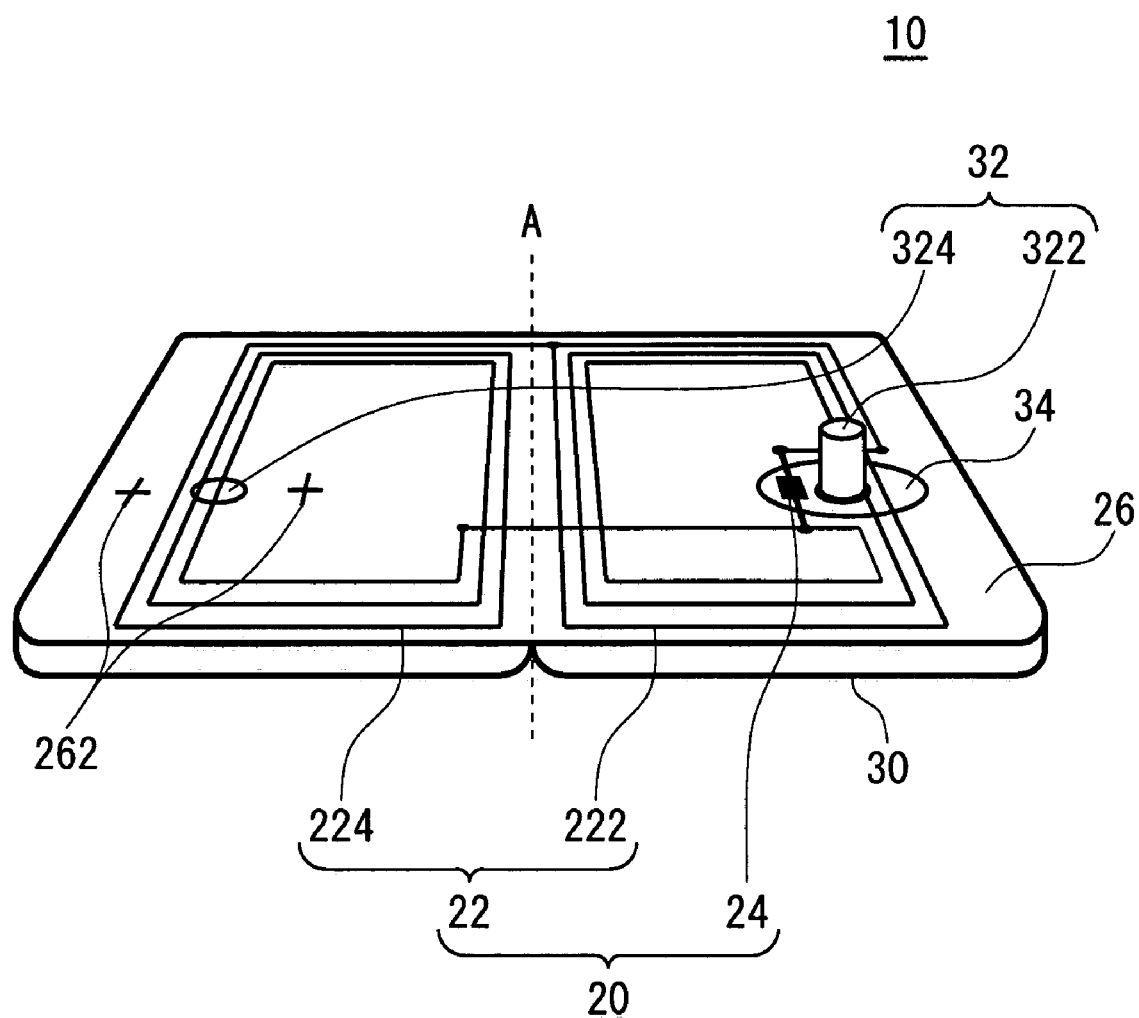
FIG. 1 is a partial perspective view of a wireless tag 10 according to a first embodiment of the present invention.

FIG. 1 is a partial perspective view of a wireless tag 10 according to a first embodiment of the present invention. It is an object of the wireless tag 10 according to the present embodiment to certainly prevent illicit use of a ticket by using the wireless tag 10 which is securely tied to an object to be authenticated. The wireless tag 10 is attached to an object and sends information on the object wirelessly. The wireless tag 10 includes a circuit module 20 for sending information and a base part on which the circuit module 20 is disposed and which is foldable. The circuit module 20 includes an electromagnetic induction unit 22, an information storing unit 24, and a film 26 on which the electromagnetic induction unit 22 and the information storing unit 24 are disposed.

The electromagnetic induction unit 22 includes a coil with a conducting wire wound and generates an electromotive force by an electromagnetic wave from the outside. The electromagnetic induction unit 22 includes a main electromagnetic induction unit 222 and a subsidiary electromagnetic induction unit 224. The information storing unit 24 stores information and outputs information by the electromotive force generated by the electromagnetic induction unit 22. Each of the main electromagnetic induction unit 222 and the subsidiary electromagnetic induction unit 224 is connected with the information storing unit 24 electrically and in parallel. The film 26 includes incisions 262 and a part of the subsidiary electromagnetic induction unit 224 is disposed between the incisions 262. The film 26 is easily broken at a region between the incisions 262 by including the incisions 262 in comparison with the case of including no incision. Therefore, the part of the subsidiary electromagnetic induction unit 224 which is disposed between the incisions 262 is easily broken in comparison with the case of including no incision.

The base part 30 is a plate of a substantially rectangular shape and can be folded with respect to a boundary line A which is located substantially at the middle of the major side of the base part 30. The base part 30 includes a locking member 32 and a cut part 34. The wireless tag 10 includes an open cut part and a disconnecting part for electrically disconnecting the subsidiary electromagnetic induction unit 224. The cut part 34 and the locking member 32 are examples of the open cut part and the disconnecting part, respectively. The locking member 32 locks the base part in its folded state. The locking member 32 includes a projection part 322 projecting from the base part 30 substantially at the center of one region of the base part 30 which is apart from the boundary line A and a base side insertion part 324 which is disposed substantially at the center of the other region of the base part 30 which is apart from the boundary line A. The base side insertion part 324 is a substantially cylindrical recess in which the projection part 322 is inserted. If the base part 30 is folded with respect to the boundary line A so that the face on which the projection part projects faces the other face, the projection part is inserted into the base side insertion part 324.

The film 26 on which the electromagnetic induction unit 22 and the information storing unit 24 are disposed is adhered to the face of the base part 30 from which the projection part 322 projects, and thus, the circuit module 20 is disposed over the base part 30. The main electromagnetic induction unit 222 and the information storing unit 24 are disposed on the side of the base part 30 where the projection part 32 apart from the boundary line A is disposed. The information storing unit 24 is disposed on the cut part 34 provided near the projection part 322. The subsidiary electromagnetic induction unit 224 is disposed on the side of the base part 30 where the base side insertion part 324 apart from the boundary line A is disposed. The conducting wire forming the subsidiary electromagnetic induction unit 224 passes over the base side insertion part 324. The incision 262 on the film 26 is disposed on either side of the base side insertion part 324.

In the initial position, the subsidiary electromagnetic induction unit 224 is coplanar with the main electromagnetic induction unit 222 as shown in FIG. 1. Further, in the layered position, the base part 30 is folded with respect to the boundary line A. In the layered position, the subsidiary electromagnetic induction unit 224 is layered on the main electromagnetic induction unit 222. The subsidiary electromagnetic induction unit 224 is integrated with the base part 30 and can bend from the initial position to the layered position. Since the subsidiary electromagnetic induction unit 224 can bend to the layered position, it is possible to make angles made by a plane formed by the main electromagnetic induction unit 222 and a plane formed by the subsidiary electromagnetic induction unit 224 different with respect to electromagnetic waves in the same direction.

Figure 2:
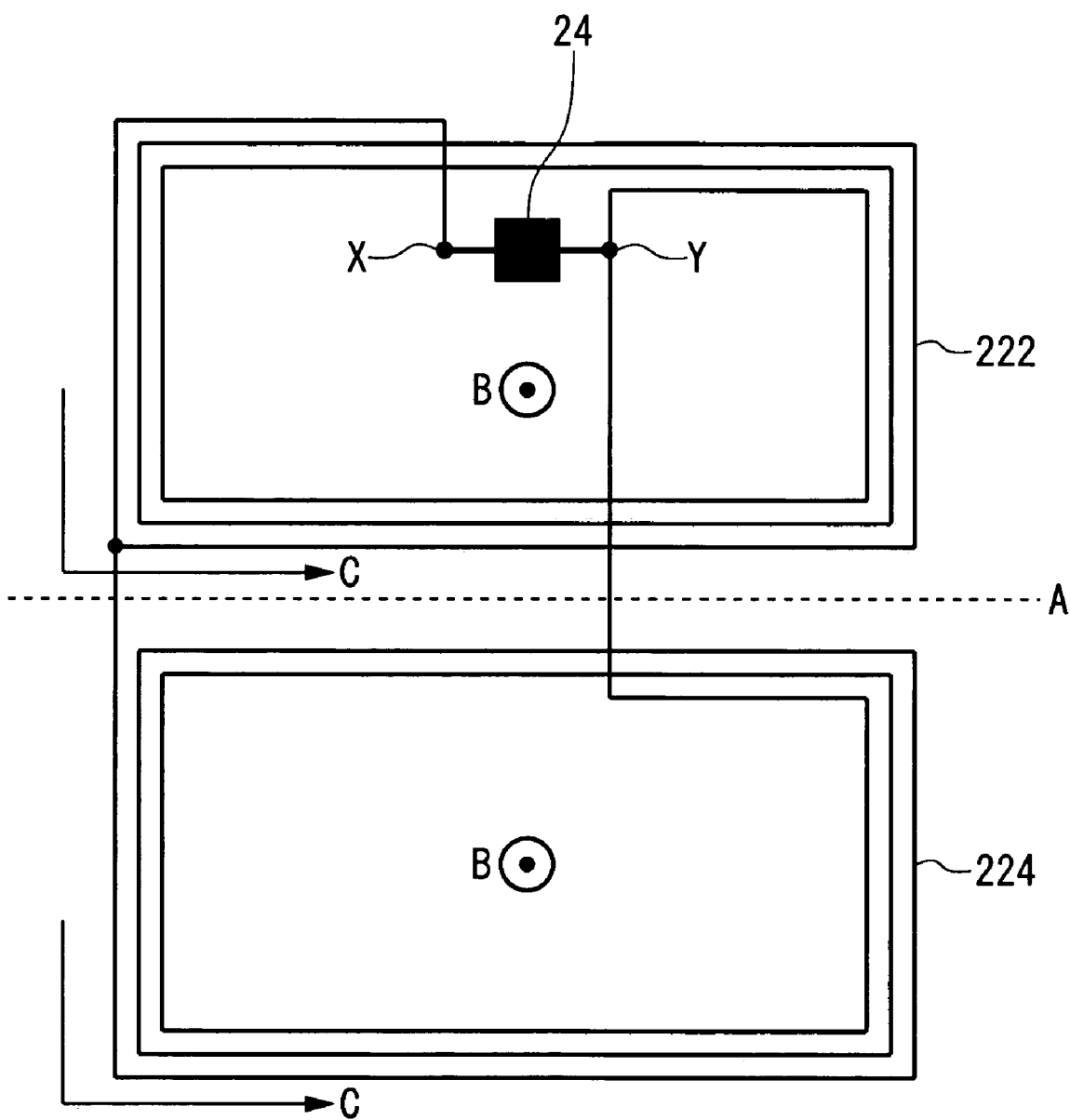
FIG. 2 is a top view of a circuit module 20 according to the first embodiment.
Figure 3:
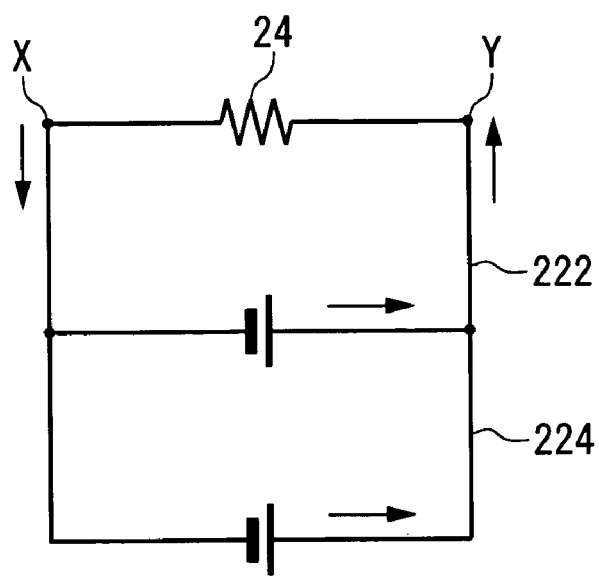
FIG. 3 is a drawing of an equivalent circuit of the circuit module 20 in the initial position of the first embodiment.
Figure 4:
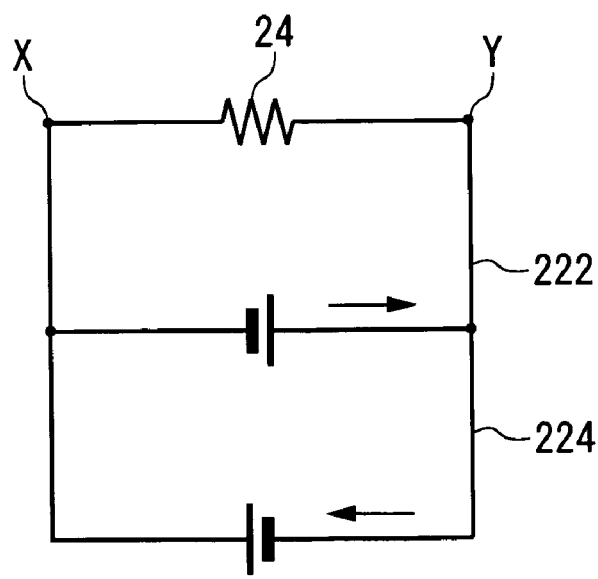
FIG. 4 is a drawing of an equivalent circuit of the circuit module 20 in the layered position of the first embodiment.

FIG. 2 is a top view of the circuit module 20 according to the first embodiment. Each of FIGS. 3 and 4 is a drawing of an equivalent circuit of the circuit module 20 in the layered position of the first embodiment. According to the first embodiment, a coil forming the main electromagnetic induction unit 222 and a coil forming the subsidiary electromagnetic induction unit 224 are wound in the same directions. Further, according to the first to fourth embodiments, at least a component, which is substantially orthogonal to the plane formed by the main electromagnetic induction unit 222 and the subsidiary electromagnetic induction unit 224, of a magnetic field of electromagnetic waves applied to the circuit module 20 from the outside is supposed to have a substantially constant phase over the whole area surrounded by the main electromagnetic induction unit 222 and the subsidiary electromagnetic induction unit 224.

In case a magnetic field of electromagnetic waves, which is directed to cross a region surrounded by each of the main electromagnetic induction unit 222 and the subsidiary electromagnetic induction unit 224 in the direction of an arrow B shown in FIG. 2, increases, current flows in the conducting wire of each of the main electromagnetic induction unit 222 and the subsidiary electromagnetic induction unit 224 in the direction of an arrow C. In this case, an equivalent circuit is shown in FIG. 3. In FIG. 3, the direction of an electromotive force generated by the subsidiary electromagnetic induction unit 224 is the same as the direction of an electromotive force generated by the main electromagnetic induction unit 222 with respect to the information storing unit 24. Further, in case a magnetic field of electromagnetic waves, which is directed to cross the region surrounded by each of the main electromagnetic induction unit 222 and the subsidiary electromagnetic induction unit 224 in the direction of the arrow B shown in FIG. 2, decreases, current flows in the conducting wire of each of the main electromagnetic induction unit 222 and the subsidiary electromagnetic induction unit 224 in the inverse of the direction of the arrow C. In this case, the direction of an electromotive force generated by the subsidiary electromagnetic induction unit 224 is also the same as the direction of an electromotive force generated by the main electromagnetic induction unit 222 with respect to the information storing unit 24.

In addition, in case a magnetic field of electromagnetic waves, which is directed to cross the region surrounded by each of the main electromagnetic induction unit 222 and the subsidiary electromagnetic induction unit 224 in the inverse direction of the arrow B shown in FIG. 2, increases, current flows in the conducting wire of each of the main electromagnetic induction unit 222 and the subsidiary electromagnetic induction unit 224 in the inverse of the direction of the arrow C. In case of decreasing, current flows in each conducting wire in the direction of the arrow C. Thus, in case the subsidiary electromagnetic induction unit 224 is in the initial position with respect to the main electromagnetic induction unit 222, the subsidiary electromagnetic induction unit 224 generates an electromotive force in the same direction as that generated by the main electromagnetic induction unit 222 with respect to the information storing unit 24. Further, voltage at terminals X and Y of the information storing unit 24 generated by the subsidiary electromagnetic induction unit 224 and the main electromagnetic induction unit 222 is higher than voltage at the terminals X and Y generated by the main electromagnetic induction unit 222 in case of receiving the same electromagnetic wave from the outside.

According to the circuit module 20 shown in FIG. 2, if the subsidiary electromagnetic induction unit 224 is folded with respect to the boundary line A to the layered position with the main electromagnetic induction unit 222, the direction of a magnetic field of electromagnetic waves with respect to the subsidiary electromagnetic induction unit 224 is reversed before and after the folding. Thus, in case a magnetic field of electromagnetic waves, which is directed to cross the region surrounded by the main electromagnetic induction unit 222 in the direction of the arrow B, increases, current flows in the main electromagnetic induction unit 222 in the direction of the arrow C and in the subsidiary electromagnetic induction unit 224 in the inverse of the direction of the arrow C. In this case, an equivalent circuit is shown in FIG. 4 and the direction of an electromotive force generated by the subsidiary electromagnetic induction unit 224 is the inverse of that of an electromotive force generated by the main electromagnetic induction unit 222 with respect to the information storing unit 24.

In the layered position similarly with the initial position, in case a magnetic field of electromagnetic waves in the direction of the arrow B decreases, current flows in the main electromagnetic induction unit 222 in the inverse of the direction of the arrow C and in the subsidiary electromagnetic induction unit 224 in the direction of the arrow C.

Further, in case a magnetic field of electromagnetic waves, which is directed to cross the region surrounded by each of the main electromagnetic induction unit 222 and the subsidiary electromagnetic induction unit 224 in the direction of the arrow B, increases, current flows in the main electromagnetic induction unit 222 in the direction of the arrow C. in case of decreasing, current flows in the subsidiary electromagnetic induction unit 224 in the inverse of the direction of the arrow C.

In case the subsidiary electromagnetic induction unit 224 is in the layered position with the main electromagnetic induction unit 222, the subsidiary electromagnetic induction unit 224 generates an electromotive force in the inverse direction of that generated by the main electromagnetic induction unit 222 with respect to the information storing unit 24. Therefore, voltage at the terminals X and Y of the information storing unit 24 generated by the subsidiary electromagnetic induction unit 224 and the main electromagnetic induction unit 222 is lower than voltage at the terminals X and Y generated by the main electromagnetic induction unit 222 in case of receiving the same electromagnetic wave from the outside.

Thus, for example, if a plane formed by the main electromagnetic induction unit 222 is disposed so as to be substantially orthogonal to the direction of a magnetic field of electromagnetic waves, voltage generated at the terminals X and Y of the information storing unit 24 is the maximum in case the subsidiary electromagnetic induction unit 224 is in the initial position with the main electromagnetic induction unit 222. As the subsidiary electromagnetic induction unit 224 moves to the layered position with respect to the main electromagnetic induction unit 222, voltage generated at the terminals X and Y of the information storing unit 24 becomes lower than voltage generated in the initial position and is minimum in the layered position. Therefore, the circuit module 20 can vary voltage generated at both ends of the information storing unit 24 according to a relative position of the subsidiary electromagnetic induction unit 224 to the main electromagnetic induction unit 222.

The information storing unit 24 has a threshold voltage which is electric power enabling information to output. The threshold voltage is lower than voltage generated at both ends of the information storing unit 24 by the main electromagnetic induction unit 222 for electromagnetic waves of a predetermined intensity from the outside and higher than voltage generated at both ends of the information storing unit 24 by the main electromagnetic induction unit 222 and the subsidiary electromagnetic induction unit 224 for electromagnetic waves of a predetermined intensity in the layered position.

For example, in case of retrieving information from the wireless tag 10 by using a retrieving apparatus, the distance between the wireless tag 10 and a source of an electromagnetic wave becomes constant and the electromagnetic wave generated by the retrieving apparatus is substantially orthogonal to a plane formed by the main electromagnetic induction unit 222 by bringing the wireless tag 10 into contact with a face emitting an electromagnetic wave of the retrieving apparatus. The main electromagnetic induction unit 222 generates voltage of a certain magnitude at both ends of the information storing unit 24 individually for an electromagnetic wave of a predetermined intensity emitted from the retrieving apparatus. Further, an electromotive force generated by each of the main electromagnetic induction unit 222 and the subsidiary electromagnetic induction unit 224 in the layered position generates voltage of a certain magnitude at both ends of the information storing unit 24 for an electromagnetic wave of the predetermined intensity. In this case, by setting the threshold voltage to an intermediate value of the voltages, the information storing unit 24 certainly operates when the main electromagnetic induction unit 222 generates an electromotive force individually and the information storing unit 24 is certainly inhibited from operating when the main electromagnetic induction unit 222 and the subsidiary electromagnetic induction unit 224 generate an electromotive force together.

In addition, voltage generated at both ends of the information storing unit 24 in case the main electromagnetic induction unit 222 and the subsidiary electromagnetic induction unit 224 are in the initial position is larger than voltage generated by the main electromagnetic induction unit 222 individually. Therefore, the information storing unit 24 has the threshold voltage and thus certainly operates even in the initial position.

Here, in the first embodiment, although coils forming the main electromagnetic induction unit 222 and the subsidiary electromagnetic induction unit 224 according to the second embodiment are wound in the same direction in the initial position, the winding direction is not limited to this. As the second embodiment, coils forming the main electromagnetic induction unit 222 and the subsidiary electromagnetic induction unit 224 are wound in the opposite directions to each other in the initial position. Thus, in case the subsidiary electromagnetic induction unit 224 is in the initial position with respect to the main electromagnetic induction unit 222, the subsidiary electromagnetic induction unit 224 generates an electromotive force of the inverse of the direction of an electromotive force generated by the main electromagnetic induction unit 222 with respect to the information storing unit 24. Further, in case the subsidiary electromagnetic induction unit 224 is in the layered position, the subsidiary electromagnetic induction unit 224 generates an electromotive force of the same as the direction of an electromotive force generated by the main electromagnetic induction unit 222 with respect to the information storing unit 24. Therefore, the circuit module 20 of the second embodiment can also vary voltage generated at both ends of the information storing unit 24 according to a relative position of the subsidiary electromagnetic induction unit 224 to the main electromagnetic induction unit 222.

Figure 5:
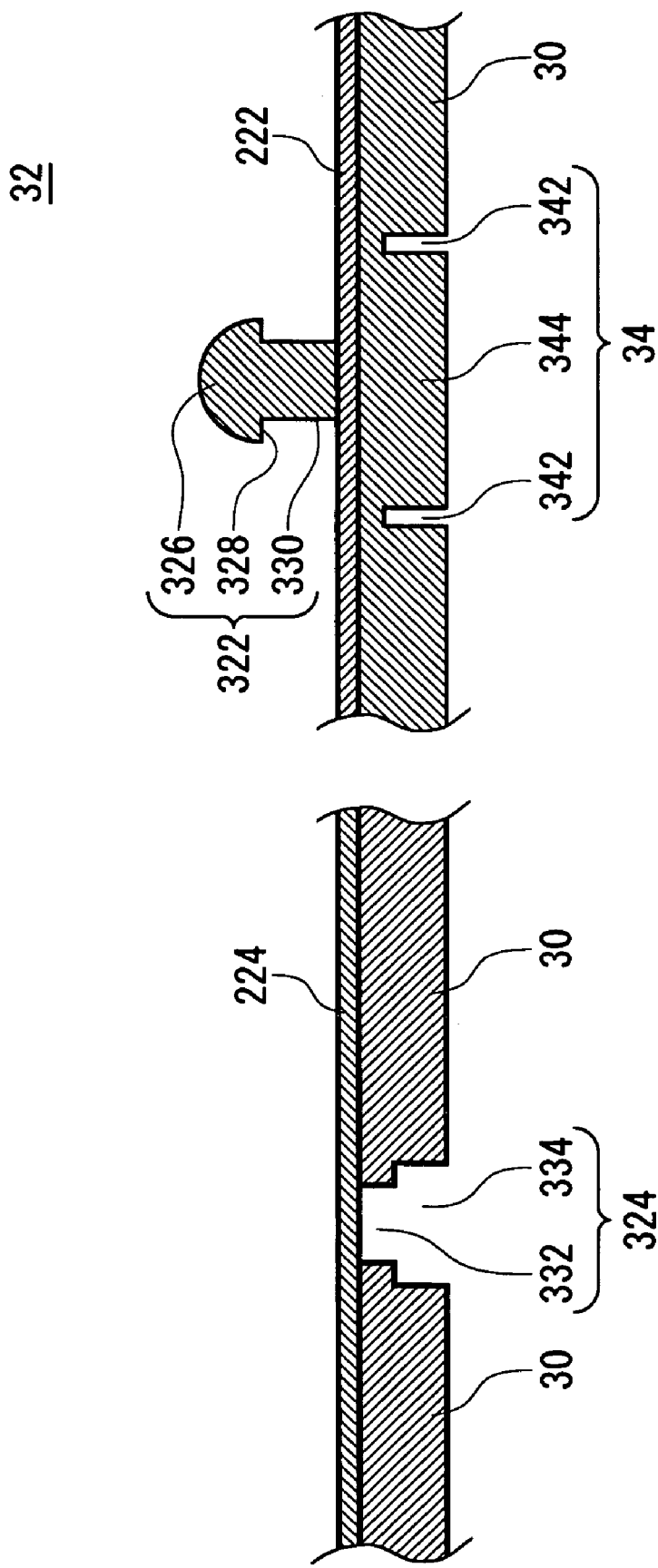
FIG. 5 is a cross-sectional view of the neighborhood of a locking member 32.

FIG. 5 is a cross-sectional view of the neighborhood of the locking member 32. The cut part 34 includes a cut 342 surrounding the projection part 322 and a pedestal 344 which is surrounded by the cut 342 and on which a part of the main electromagnetic induction unit 222 is disposed. The pedestal 344 is surrounded the cut 342 and thus can be easily separated from the base part 30 with a smaller force than that of a case the cut 342 is not provided.

The projection part 322 of the locking member 32 is substantially cylindrical and includes a hemispherical portion 326, a curved portion 328, and a cylindrical portion 330. The hemispherical portion 326 is provided at the proximal end of the projection part 322 and substantially hemispherical. The cylindrical portion 330 is connected to the pedestal 344 and its diameter is smaller than the diameter of a circle formed by the hemispherical portion 326. The curved portion 328 is provided between the hemispherical portion 326 and the cylindrical portion 330.

The base side insertion part 324 includes a narrow portion 332 and a wide portion 334 of which hole is larger than that of the narrow portion 332 in diameter. The diameter of the hole of the narrow portion 332 is substantially the same as the diameter of the cylindrical portion 330 and the narrow portion 332 is provided on the side of the base side insertion part 324 where the subsidiary electromagnetic induction unit 224 is disposed. The wide portion 334 is provided in the base side insertion part 324 on the opposite side of the subsidiary electromagnetic induction unit 224 with the narrow portion 332 left between the wide portion 334 and the subsidiary electromagnetic induction unit 224. The diameter of the wide portion 334 is larger than that of the narrow portion 332 and substantially the same as that of the curved portion 328.

Figure 6:
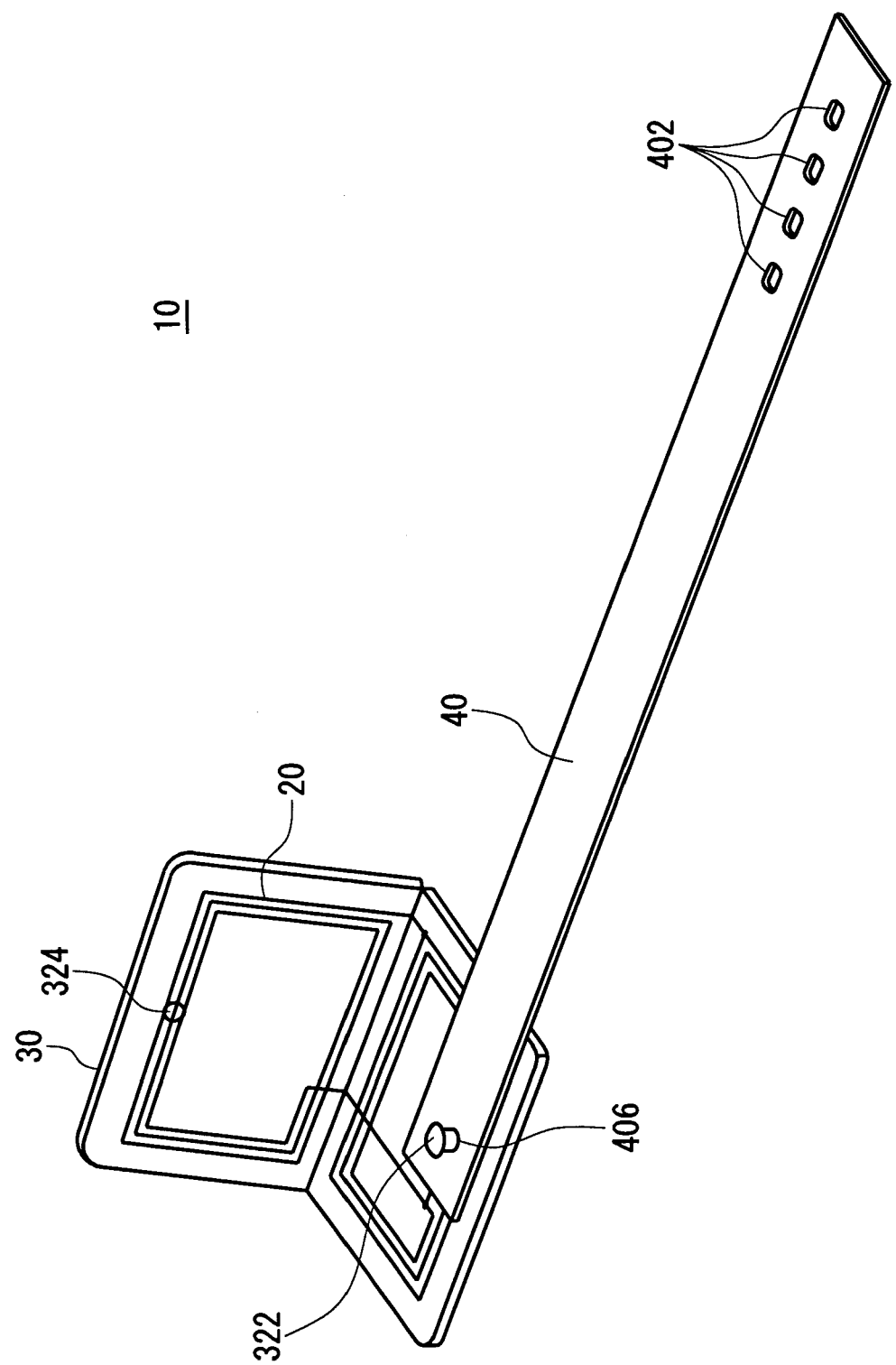
FIG. 6 is a figure describing an installing method of the wireless tag 10.
Figure 7:
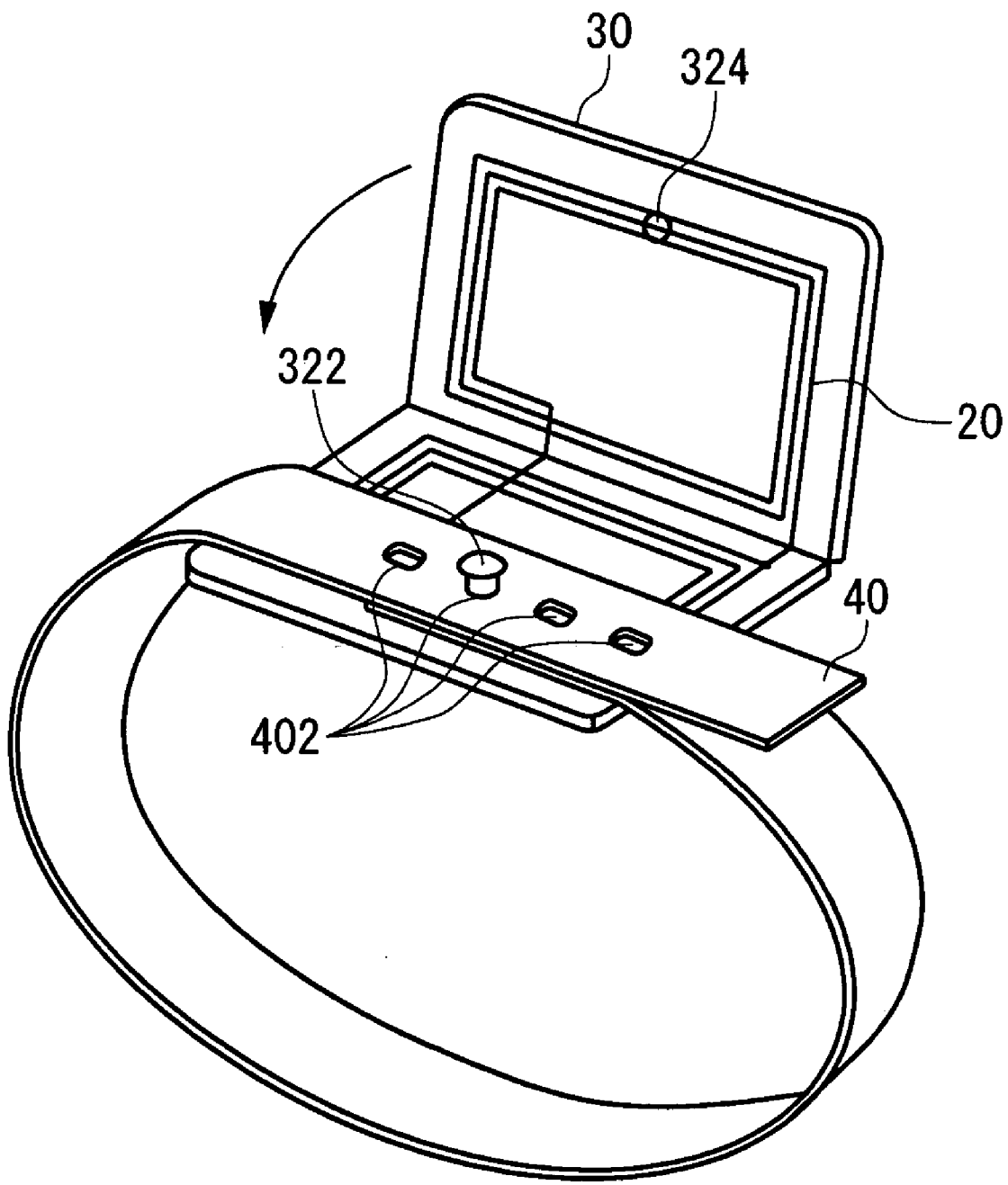
FIG. 7 is a figure describing an installing method of the wireless tag 10.
Figure 8:
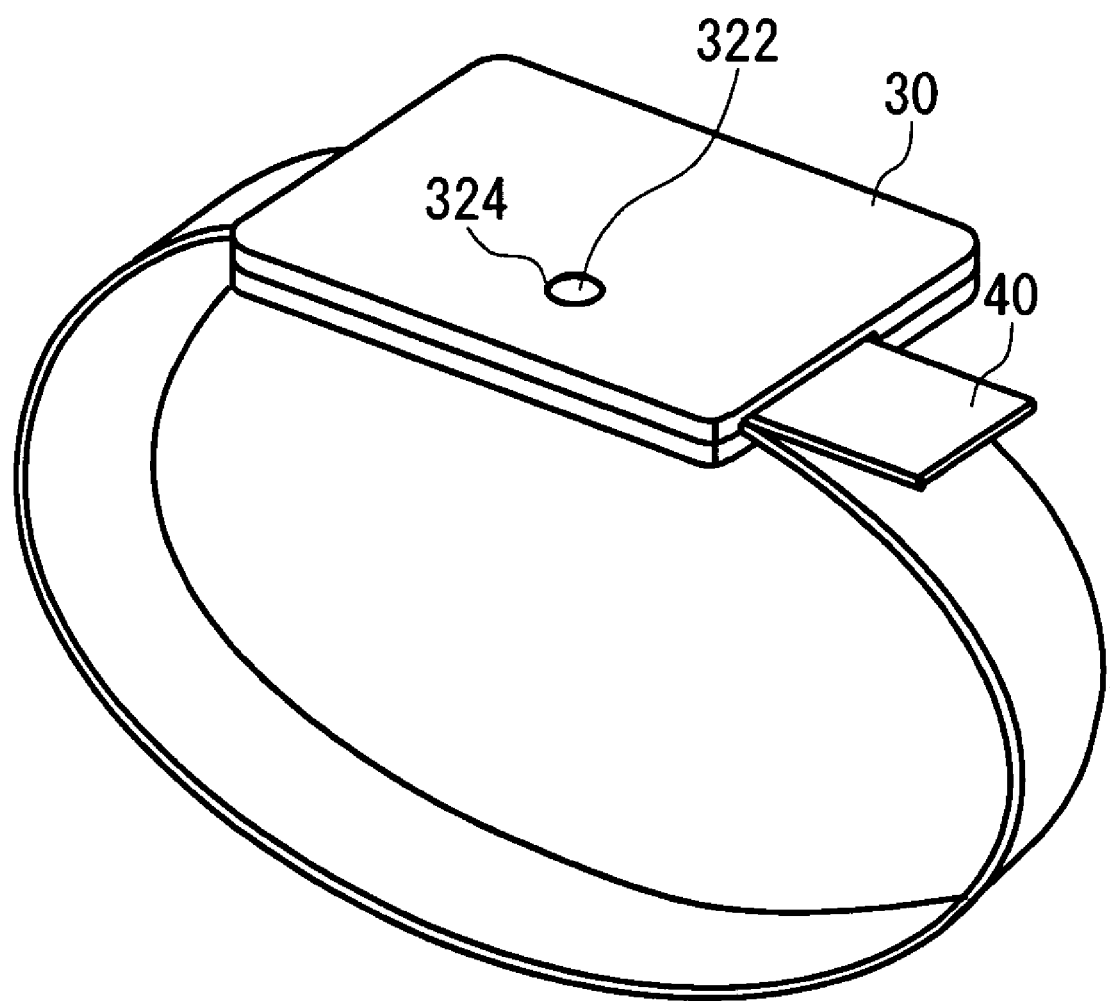
FIG. 8 is a figure describing an installing method of the wireless tag 10.

FIGS. 6 to 8 describe an installing method of the wireless tag 10. The wireless tag 10 includes a belt 40 of the shape of band for attaching the circuit module 20 and the base part 30 to an object. The belt 40 is an example of an attachment part for attaching the circuit module 20 to the object. The belt 40 includes holes 402 and a locking hole 406. A plurality of holes 402 are provided in the belt 40. Thus, even in case the size of an object to which the circuit module 20 is attached is varied, the belt 40 can attach the circuit module 20 securely to the object.

As shown in FIG. 6, the belt 40 is attached to the circuit module 20 by inserting the projection part 322 into the locking hole 406. After the circuit module 20 and the belt 40 are disposed on the base part 30, information is stored in the circuit module of the wireless tag 10. Further, the circuit module 20 may be disposed on the base part 30 after information was stored in the circuit module previously.

As shown in FIG. 7, in order to attach the wireless tag 10 to an object, the belt 40 becomes a ring shape, the hole 402 into which the projection part 322 will be inserted is selected according to the size of the object, and the projection part 322 is inserted into the selected hole 402. Then, as shown in FIG. 8, by folding the base part 30 with the belt 40 disposed between the both sides, the projection part is inserted into the base side insertion part 324 and the base part 30 is locked in its folded state. Therefore, it makes the circuit module 20 securely attached to the object to fold the base part 30.

Figure 9:
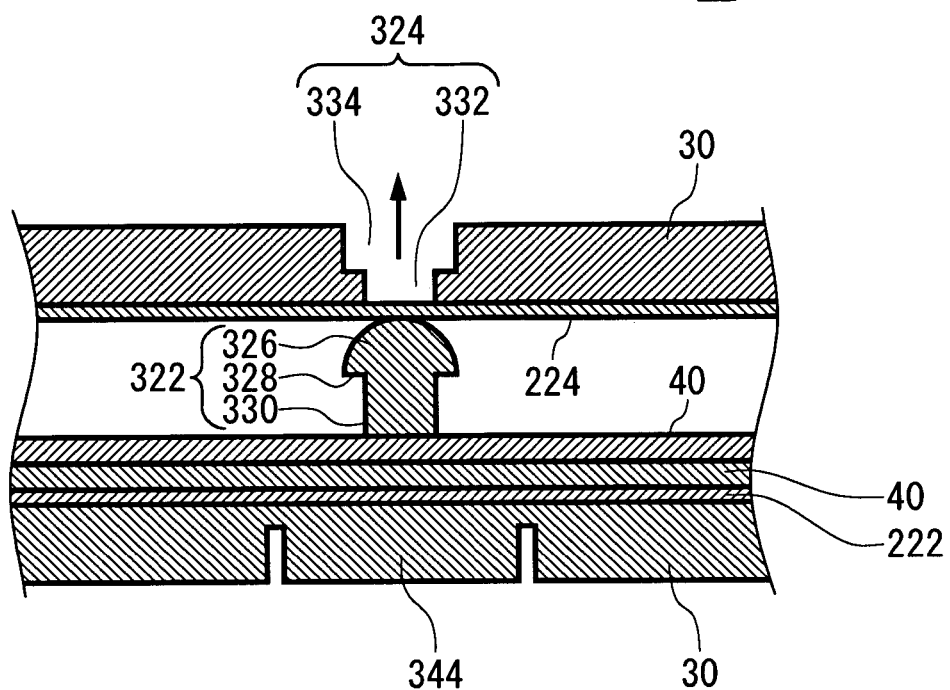
FIG. 9 is a cross-sectional view of the locking member 32 just before engagement.
Figure 10:
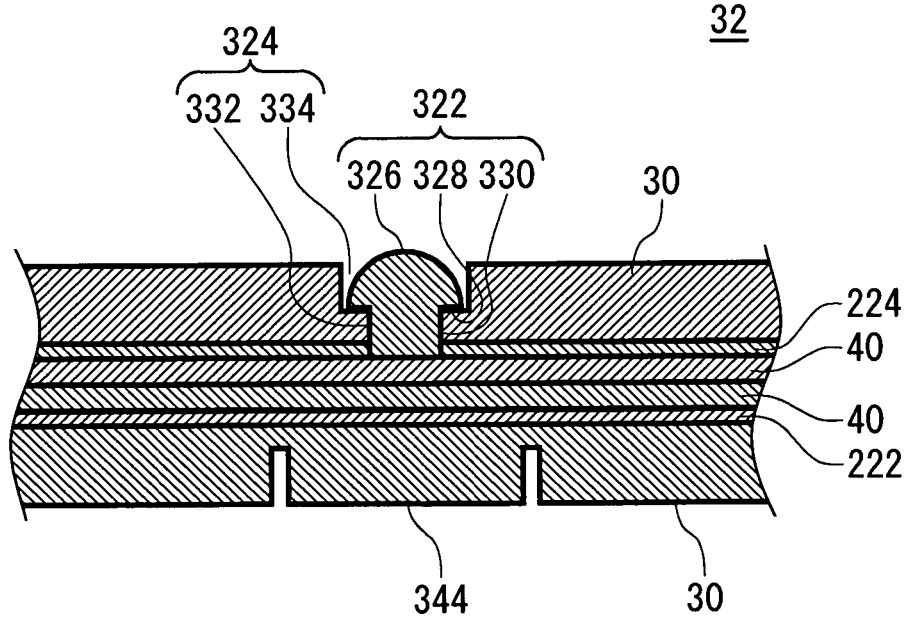
FIG. 10 is a cross-sectional view of the locking member 32 in the layered position.

FIG. 9 is across-sectional view of the locking member 32 just before engagement, and FIG. 10 is a cross-sectional view of the locking member 32 in the layered position. The base part 30 is bent and thus the base side insertion part 324 of the locking member 32 is disposed to face the projection part 322 which is inserted into the belt 40 via the subsidiary electromagnetic induction unit 224. In the position of FIG. 9, the subsidiary electromagnetic induction unit 224 is on its way to the layered position. In the state, the subsidiary electromagnetic induction unit 224 still constitutes an electrically closed circuit. In the position of FIG. 9, the subsidiary electromagnetic induction unit 224 generates an electromotive force of the inverse of the direction of an electromotive force generated by the main electromagnetic induction unit 222 with respect to the information storing unit 24.

By receiving electromagnetic waves, each of the main electromagnetic induction unit 222 and the subsidiary electromagnetic induction unit 224 generates an electromotive force with respect to the information storing unit 24. According to the first embodiment, the direction of an electromotive force generated by the subsidiary electromagnetic induction unit 224 in the position shown in FIG. 9 is reverse to that of an electromotive force generated by the main electromagnetic induction unit 222 with respect to the information storing unit 24, and voltage generated against the information storing unit 24 is lower than an electromotive force generated by the main electromagnetic induction unit 222 individually. Since the voltage generated against the information storing unit 24 is lower than the threshold voltage of the information storing unit 24, the information storing unit 24 according to the first embodiment does not operate in the position shown in FIG. 9.

If the base part 30 is folded from the position shown in FIG. 9 and thus the projection part 322 is pushed up in the direction of an arrow shown in FIG. 9, the projection part 322 cuts a part of the subsidiary electromagnetic induction unit 224 disposed on the base side insertion part 324. If the base part 30 is folded and the projection part 322 is pushed up, the narrow portion 332 of the base side insertion part 324 is elastically deformed and thus the hemispherical portion 326 and the curved portion 328 of the projection part 322 pass through the narrow portion 332 of the base side insertion part 324 to reach the wide portion 334 of the base side insertion part 324 (FIG. 10).

The base part 30 is folded from the position of FIG. 9 to that of FIG. 10, and thus, the subsidiary electromagnetic induction unit 224 is moved to the layered position with respect to the main electromagnetic induction unit 222. In case the subsidiary electromagnetic induction unit 224 is moved to the layered position, the projection part 322 of the locking member 32 electrically cuts off the subsidiary electromagnetic induction unit 224. Since a part of the electromagnetic induction unit 22 is cut off by folding the base part 30, the wireless tag 10 can vary the circuit configuration of the electromagnetic induction unit 22 before and after the base part 30 is folded.

The projection part 322 includes the hemispherical portion 326, which makes the projection part 322 easily inserted into the narrow portion 332 of which diameter is smaller than that of the hemispherical portion 326. Further, the projection part 322 includes the hemispherical portion 326, which makes the projection part 322 inserted into the base side insertion part 324 with a force smaller than a force required to separate the pedestal 344 from the base part 30. The projection part 322 includes the curved portion 328, and thus, a force required to pull out the projection part 322 from the base side insertion part 324 is larger than that required to insert the projection part 322 into the base side insertion part 324. Therefore, the projection part 322 and the base side insertion part 324 are securely engaged without easily being disengaged. Further, a force required to pull out the projection part 322 from the base side insertion part 324 is large than a force required to separate the pedestal 344 from the base part 30.

Figure 11:
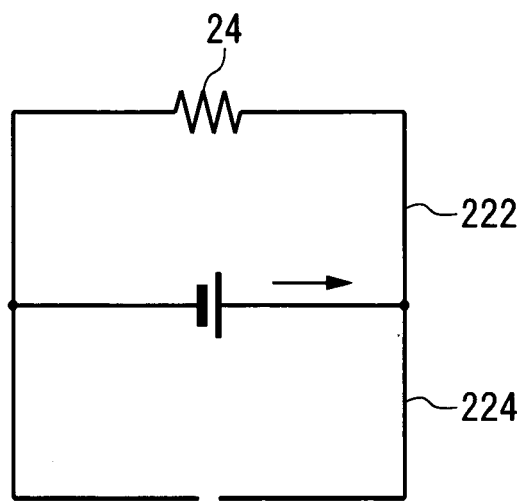
FIG. 11 is a drawing of an equivalent circuit of the circuit module 20 in the layered position of the first embodiment.

FIG. 11 is a drawing of an equivalent circuit of the circuit module 20 in the layered position of the first embodiment. The main electromagnetic induction unit 222 and the subsidiary electromagnetic induction unit 224 generates electromotive forces of the opposite directions to each other in the initial position, which makes the circuit module 20 according to the first embodiment not operate. However, since the circuit of the subsidiary electromagnetic induction unit 224 is fold to the layered position and thus electrically cut off, the subsidiary electromagnetic induction unit 224 does not generate an electromotive force with respect to the information storing unit 24. Thus, the information storing unit 24 operates by an electromotive force generated by the main electromagnetic induction unit 222. Therefore, the circuit module 20 according to the first embodiment certainly operates in the layered position.

Figure 12:
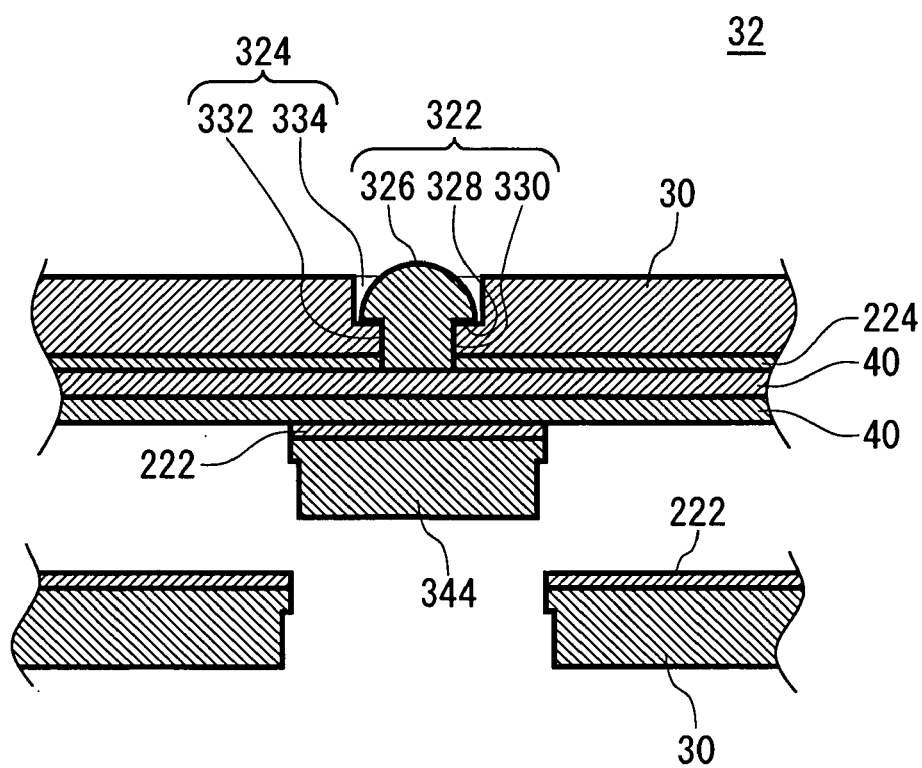
FIG. 12 is a cross-sectional view of the neighborhood of the locking member 32 in case a base part 30 is open.
Figure 13:
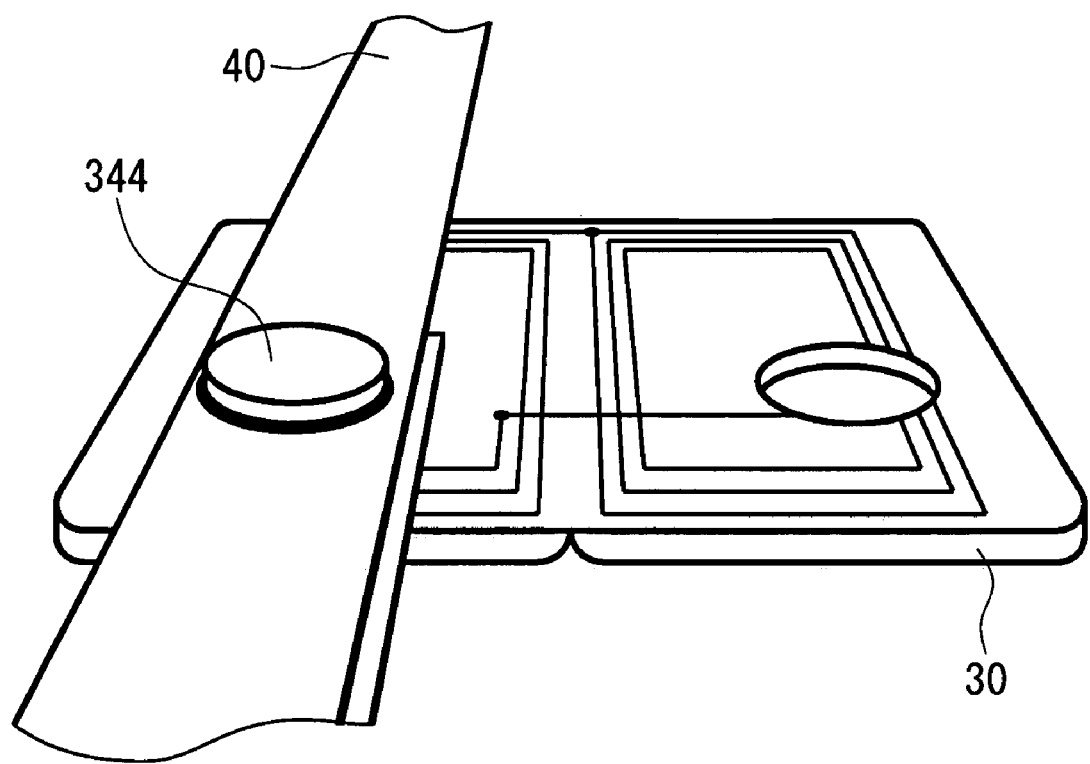
FIG. 13 is a perspective view of the wireless tag 10 in case the base part 30 is open.

FIG. 12 is across-sectional view of the neighborhood of the locking member 32 in case the base part 30 is open, and FIG. 13 is a perspective view of the wireless tag 10 in case the base part 30 is open. In case the base part 30 is open from the folded state, the pedestal 344 is separated from the base part 30 with a force smaller than that required to pull out the projection part 322 of the locking member 32 from the base side insertion part 324. Thus, a part of the main electromagnetic induction unit 222 disposed on the base part 30 and the pedestal 344 is electrically cut off. Therefore, it is possible to certainly inhibit the wireless tag 10 from operating by opening the base part 30 from its folded state. Further, since the wireless tag 10 with the belt 40 is securely attached to an object, the wireless tag 10 is certainly inhibited from operating in case the wireless tag 10 is separated from the object.

In case information is stored as a ticket in the information storing unit 24 of the wireless tag 10 according to the first embodiment, the wireless tag 10 is attached to a user when the subsidiary electromagnetic induction unit 224 is folded to the layered position. If the subsidiary electromagnetic induction unit 224 is folded certainly to the layered position, the subsidiary electromagnetic induction unit 224 is cut and the main electromagnetic induction unit 222 applies voltage higher than the threshold voltage to the information storing unit 24 by electromagnetic waves of the outside. Therefore, the wireless tag 10 certainly operates and the user can show the information stored in the wireless tag 10 as a ticket to a receptionist of an event. Further, if the wireless tag is open again, the wireless tag 10 does not operate. Thus, the user with the operating wireless tag 10 on his/her body proves that the wireless tag 10 is not attached again once it was separated after it had been attached for the first time. Therefore, a ticket and a user to whom the ticket is attached for the first time are securely tied. Thus, for example, it is possible to prevent illicit use at an event hall.

Further, since the wireless tag 10 securely tied to the object sends information on the object, an employee of a hospital can manage patients such as a new-born baby and an aged man with dementia without a mistake. Further, in case of attaching the wireless tag 10 on a bottle of drugs, it is possible to confirm whether or not the bottle has been open as well as get information on the drugs by retrieving information from the wireless tag 10.

Figure 14:
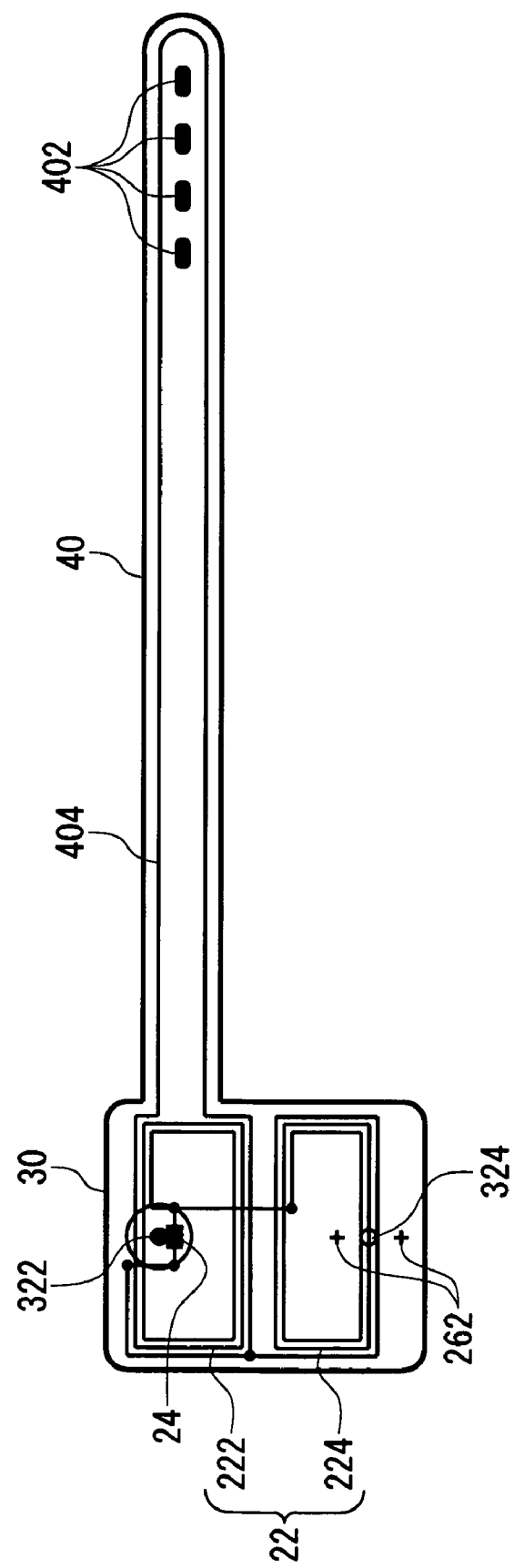
FIG. 14 is a top view of the wireless tag 10 according to the third embodiment.

FIG. 14 is a top view of the wireless tag 10 according to the third embodiment. Out of elements of the wireless tag 10 shown in FIG. 14, elements which are the same as those in FIG. 1 are indicated by the same reference numerals as those in FIG. 1 and description on the elements is omitted. A conducting wire part 404 is disposed on the belt 40, is electrically connected with the electromagnetic induction unit 22 and the information storing unit 24 in series, and constitutes a closed circuit with the information storing unit 24. If the belt 40 becomes a ring shape, the wireless tag 10 is attached to an object and the conducting wire part 404 becomes a ring shape substantially in accordance with the ring shape of the belt 40. The base part 30 is integrated with the belt 40.

According to the wireless tag 10 according to the third embodiment, a part of the main electromagnetic induction unit 222 is electrically cut off and the wireless tag 10 is certainly inhibited from operating by opening the subsidiary electromagnetic induction unit 224 from its folded state. In addition, in case of separating the wireless tag 10 from the object by cutting the belt 40, the wireless tag 10 is certainly inhibited from operating because the conducting wire part 404 is electrically cut off. Therefore, it is possible to certainly prevent illicit use of the wireless tag 10.

Figure 15:
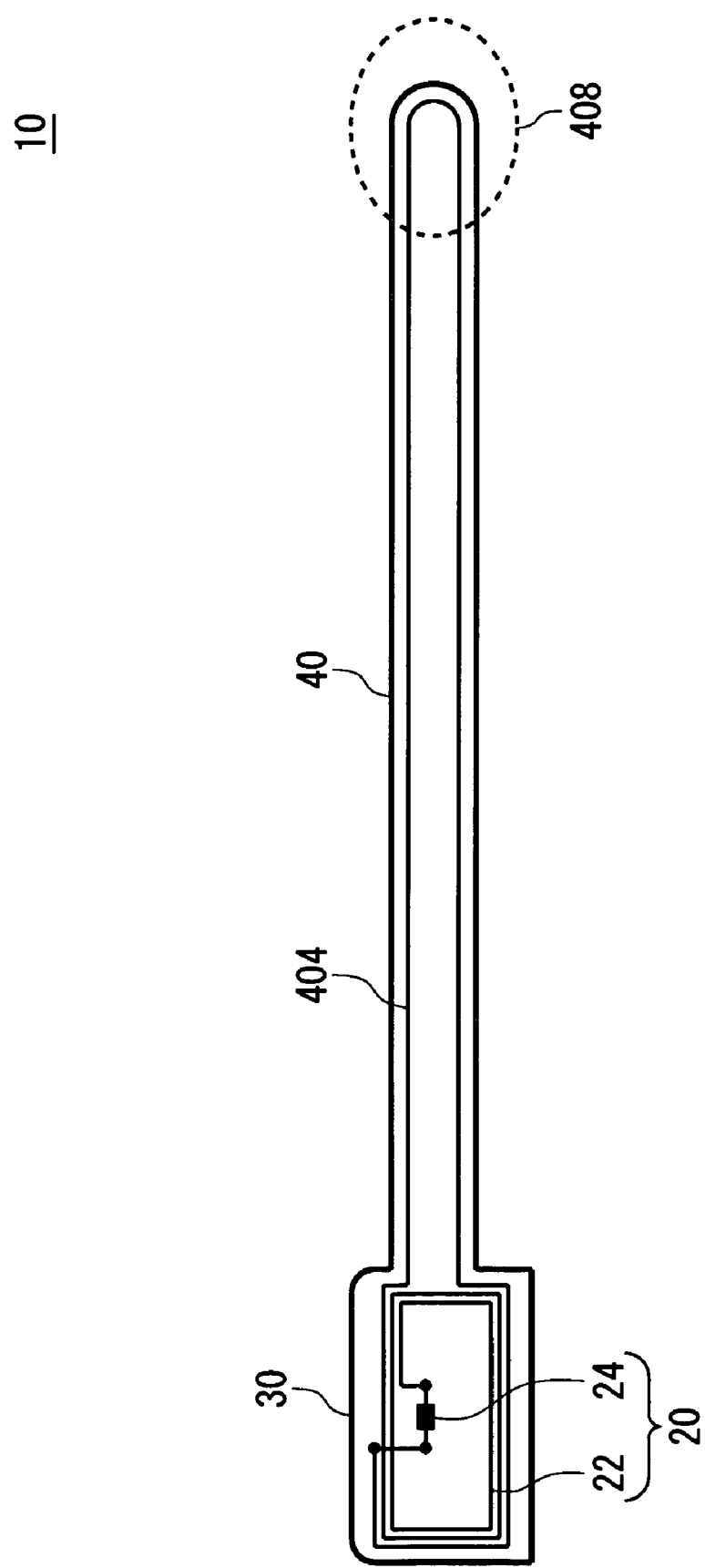
FIG. 15 is a top view of the wireless tag 10 according to the fourth embodiment.

FIG. 15 is a top view of the wireless tag 10 according to the fourth embodiment. Out of elements of the wireless tag 10 shown in FIG. 15, elements which are the same as those in FIG. 14 are indicated by the same reference numerals as those in FIG. 14 and description on the elements is omitted. An adhesion part 408 is provided at an end of the belt 40 where the base part 30 is not disposed and on a face where the conducting wire part 40 is disposed. The adhesion part 408 is a region of the belt 40 on which adhesive is applied, for example, by adhesive-sealing. A part of the conducting wire part 404 is disposed between the adhesion part 408 and the belt 40.

By adhering the back surface of the belt 40 on which the adhesion part 408 is disposed to the base part 30 or the front surface of the belt 40 on which the adhesion part 408 is not disposed, the belt 40 becomes a ring shape and the wireless tag 10 can be attaches to an object. Further, an adhesive strength of the adhesive applied on the adhesion part 408 is larger than strength of adhering the conducting wire part 404 and the belt 40. Thus, if the adhesion part 408 is adhered to the front surface of the belt 40 and then the back surface on which the adhesion part 408 is disposed and the front surface which is adhered to the back surface of the belt 40 are pulled apart, the conducting wire part 404 near the adhesion part 408 remains adhered on the front surface of the belt 40 with the adhesion part 408.

In the meantime, the rest of the conducting wire part 404 which is not near the adhesion part 408 remains on the back surface of the belt 40. In addition, if the back surface on which the adhesion part 408 is disposed and the front surface which is adhered to the back surface of the belt 40 are pulled apart, strength of pulling apart them is applied to the conducting wire part 404 and the conducting wire part 404 is cut off. Thus, the information storing unit 24 does not operate. Therefore, in case of separating the wireless tag 10 attached to an object from the object, the wireless tag 10 is inhibited from operating and illicit use of the wireless tag 10 is prevented.

Figure 16:
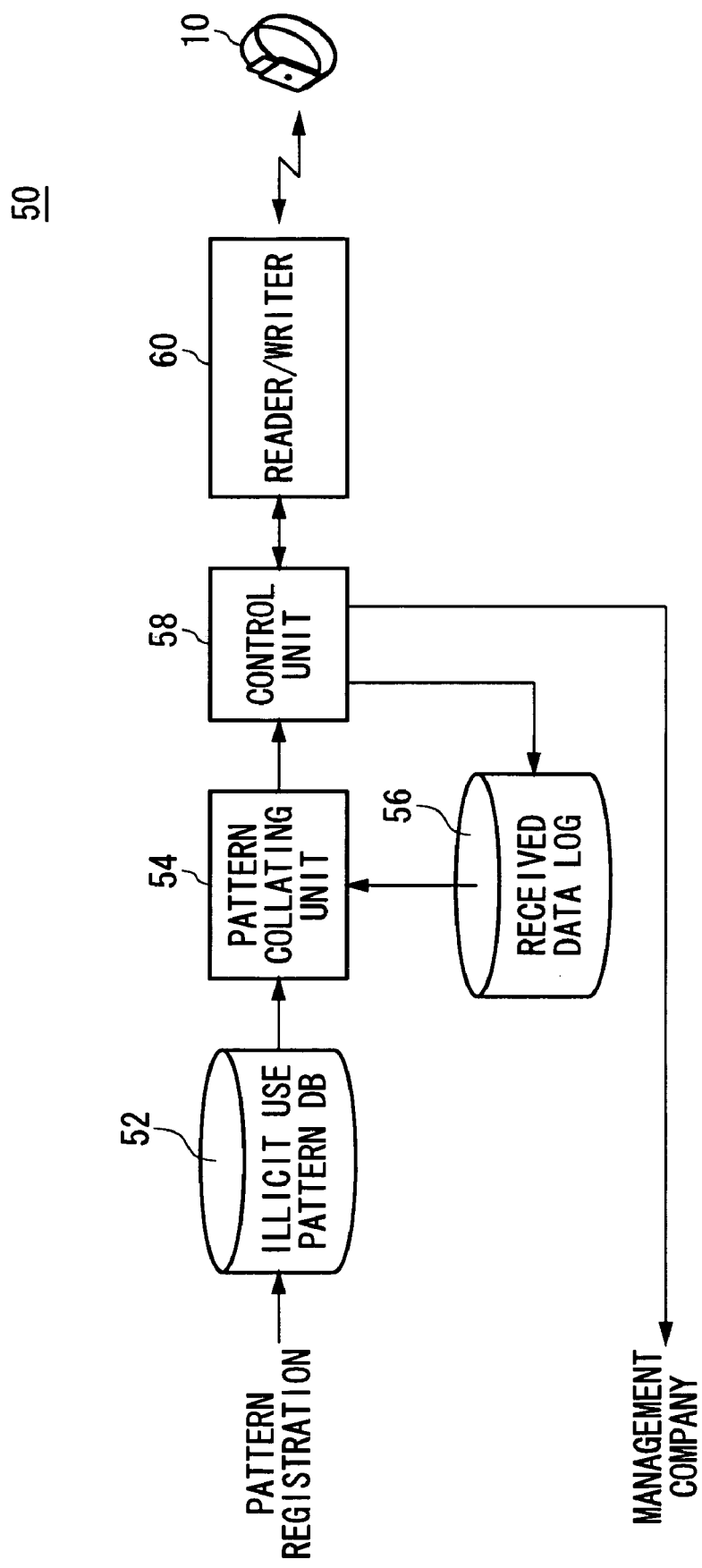
FIG. 16 shows the configuration of a visitor control system 50 using the wireless tag 10.

FIG. 16 shows the configuration of a visitor control system 50 using the wireless tag 10. The visitor control system 50 used at an event hall and the like includes an illicit use pattern database 52 for storing assumed patterns of illicit use, a received data log 56 for storing detected information on a visitor, a pattern collating unit 54 for collating a pattern of the illicit use pattern database 52 with that of the received data log 56, a wireless tag 10 attached to a user, a reader/writer 60 for communicating with the wireless tag 10, and a control unit 58 for controlling the reader/writer 60.

The illicit use pattern database 52 is a database in which such things which seem like illicit use are registered in a form of a list. For example, a pattern which seems like illicit use is a pattern showing a plurality of times of entrance per a unit time, a pattern showing a responsive electromagnetic wave weaker than that of a normal wireless tag because the wireless tag 10 is not attached, does not operate, or is not folded to its layered position, and the like.

The received data log 56 is a database for storing information received by the control unit 58 from the wireless tag 10 with the time of reception corresponding to it. The pattern collating unit 54 retrieves entrance patterns from the illicit use pattern database 52 and the received data log 56 and judges whether or not an entrance pattern registered in the illicit use pattern database 52 coincides with that retrieved from the received data log 56. In case the entrance pattern of the illicit use pattern database 52 coincides with that of the received data log 56, the pattern collating unit 54 informs the control unit 58 of that. The control unit 58 controls the reader/writer 60 and makes information received from the reader/writer 60 stored in the received data log 56.

The wireless tag 10 is attached to an object and sends information on the object wirelessly. The reader/writer 60 receives information from the wireless tag 10 attached to the user by using an electric wave and sends the received information to the control unit 58. Further, in case the pattern collating unit 54 confirms illicit use, the reader/writer 60 makes a strange noise and thus informs the user and a concerned person of the illicit use. In addition, in case the pattern collating unit 54 confirms illicit use, the control unit 58 may inform a management center of the illicit use via a communication network. Thus, illicit use of a entrance ticket is certainly prevented.

Although the present invention has been described by way of exemplary embodiments, it should be understood that those skilled in the art might make many changes and substitutions without departing from the spirit and the scope of the present invention which is defined only by the appended claims.

As clear from the above description, according to the present invention, it is possible to tie the wireless tag 10 to an object and certainly prevent illicit use of a ticket.

What is claimed is:

1. A wireless tag comprising:
   a circuit module having an electromagnetic induction unit for generating an electromotive force by an electromagnetic wave of the outside and an information storing unit for storing information and outputting the information by the electromotive force; and
   a base part on which said circuit module is disposed and which is foldable,
   wherein said circuit module has;
   a first circuit configuration which enables an operation of said information storing unit when said base part is open,
   a second circuit configuration which cuts off at least a part of said circuit module in an irreparable manner and maintains the operation of said information storing module when said base part is folded, and
   a third circuit configuration which further cuts off an other part of said circuit module in an irreparable way and inhibits operation of said information storing unit when said circuit board is open from its folded state.

2. A wireless tag as claimed in claim 1, further comprising a belt for attaching said circuit module to an object, wherein said base part is folded with said belt disposed between its both sides and thus said belt becomes a ring shape.

3. A wireless tag as claimed in claim 2, wherein said locking member is disposed near said information storing unit and has a projection part projecting from said base part and a base side insertion part into which said projection unit is inserted, and said belt has a hole into which said locking member is inserted in case of being disposed between both sides of said base part.

4. A wireless tag as claimed in claim 1, wherein the wireless tag is attached to an object and sends information on the object wirelessly, and further comprising:
   an attachment part for attaching said circuit module to the object; and
   a conducting wire part disposed on said attachment part which constitutes a closed circuit with at least said information storing unit,
   wherein said conducting wire part is electrically cut off in case said circuit module is separated from the object, and thus, said information storing unit is inhibited from operating in said third circuit configuration.

5. A wireless tag as claimed in claim 4, wherein said attachment part has a belt for attaching said circuit module to the object by the ring shape of the belt and said conducting wire part has a ring shape substantially in accordance with the ring shape of said belt.

6. A wireless tag as claimed in claim 5, wherein said conducting wire part is electrically connected with said electromagnetic induction unit and said information storing unit in series.

7. A wireless tag as claimed in claim 1, wherein said base part includes:
   a locking member which electrically cuts off a part of said circuit module in case that said base part is folded and locks said base part in a folded state; and
   an open cut part which electrically cuts off the other part of said circuit module when said base part is opened from the folded state.

8. A wireless tag as claimed in claim 7, wherein said locking member is disposed near said information storing unit and has a projection part projecting from said base part and a base side insertion part into which said projection unit is inserted, said open cut part has a cut part with a cut surrounding said projection part and said information storing unit, and said cut part is separated from said base part by a force smaller than a force required to pull out said projection part from said base side insertion part in case said base part is open from the folded state and thus said circuit module is electrically cut off.

9. A wireless tag as claimed in claim 7, further comprising a belt for attaching said circuit module to an object, wherein said base part is folded with said belt disposed between its both sides and thus said belt becomes a ring shape.

10. A wireless tag as claimed in claim 9, wherein said belt has a hole into which said locking member is inserted in case of being disposed between both sides of said base part.

11. A wireless tag as claimed in claim 10, further comprising a conducting wire part disposed on said attachment part which constitutes a closed circuit with at least said information storing unit,
   wherein said conducting wire part has substantially a ring shape in accordance with the ring shape of said belt,
   said electromagnetic induction unit has a main and a subsidiary electromagnetic induction units,
   said subsidiary electromagnetic induction unit is electrically connected with said main electromagnetic induction unit in parallel and in a manner for bending from an initial position where said subsidiary electromagnetic induction unit is coplanar with said main electromagnetic induction unit to a layered position where said subsidiary electromagnetic induction unit is layered on said main electromagnetic induction unit, and
   said locking member electrically cuts off said subsidiary electromagnetic induction unit in case said subsidiary electromagnetic induction unit moves from the initial position to the layered position.

12. A wireless tag as claimed in claim 7, wherein said locking member cuts off a part of said electromagnetic induction unit and said open cut part cuts off the other part of said electromagnetic induction unit.

* * * * *